(12) United States Patent
Ylinen et al.

(10) Patent No.: US 8,635,317 B2
(45) Date of Patent: Jan. 21, 2014

(54) METHOD AND APPARATUS FOR PROVIDING UNIFORM CONTENT MANAGEMENT

(75) Inventors: Samuli Ylinen, Tampere (FI); Teemu Kankaanpää, Pirkkala (FI); Ari-Pekka Hirvonen, Helsinki (FI); Jaana Huotari, Tampere (FI); Andrew Daymond, Tampere (FI); Aki Tamminen, Tampere (FI); Aki Lehto, Nokia (FI); Kalle Ojala, Lempäälä (FI); Marko Lindgren, Espoo (FI); Christopher Michael Nyffeler, San Francisco, CA (US); Nerea Armendariz, Navarra (ES); Kristian Russell Thomas Simsarian, San Francisco, CA (US); Energy Cruse, II, Foster City, CA (US); Anne Sybille Pascual, Munich (DE); Marcus Hauer, Munich (DE); Abbe Don, San Francisco, CA (US); Astrid Jantina Van Der Flier, San Francisco, CA (US); Scott Yiu-Lun Tong, San Francisco, CA (US); Adam Glazier, Fairfax, CA (US); Jeffrey John Cunningham, San Francisco, CA (US); Stephen O'Connor, London (GB); Katrin B. Gosling, Woodside, CA (US)

(73) Assignee: Nokia Corporation, Espoo (FI)

( * ) Notice: Subject to any disclaimer, the term of this patent is extended or adjusted under 35 U.S.C. 154(b) by 432 days.

(21) Appl. No.: 12/490,191

(22) Filed: Jun. 23, 2009

(65) Prior Publication Data
US 2010/0325211 A1 Dec. 23, 2010

(51) Int. Cl.
*G06F 15/173* (2006.01)

(52) U.S. Cl.
USPC .............. 709/223; 709/203; 709/246; 726/29

(58) Field of Classification Search
USPC .......... 709/200, 203, 223, 224, 246; 707/103; 726/29
See application file for complete search history.

(56) References Cited

U.S. PATENT DOCUMENTS

| 7,076,736 B2 * | 7/2006 | Hugh ........................... 715/743 |
| 7,181,468 B2 | 2/2007 | Spring et al. |

(Continued)

FOREIGN PATENT DOCUMENTS

| EP | 2015214 A2 | 1/2009 |
| WO | 2005/076156 A1 | 8/2005 |

(Continued)

OTHER PUBLICATIONS

Swierad, D., Zabierowski, W., Napieralski, A.: Universal Content Management System with Ajax Technology (Abstract). CAD Systems in Microelectronics 2009, Zakarpattya, Ukraine, 484-486 (2009).

(Continued)

*Primary Examiner* — Frantz Jean
(74) *Attorney, Agent, or Firm* — Ditthavong Mori & Steiner, P.C.

(57) ABSTRACT

An approach is provided for providing uniform content management for a user equipment. A uniform content management platform determines new content from a plurality of content of different categories. The uniform content management platform further initiates presentation of the new content via a graphical user interface that includes: a dashboard providing a layout of the new content, a content manager that is invoked upon selection of a particular one of the new content for managing a group of content of a common category, and a content editor that is invoked upon selection of one of the content in the group for editing the selected content.

20 Claims, 13 Drawing Sheets

(56) References Cited

U.S. PATENT DOCUMENTS

| | | |
|---|---|---|
| 7,386,530 B2 * | 6/2008 | Kiessig et al. ............................ 1/1 |
| 7,401,289 B2 | 7/2008 | Lachhwani et al. |
| 7,472,170 B2 * | 12/2008 | Zak et al. ...................... 709/218 |
| 2003/0222913 A1 | 12/2003 | Mattila et al. |
| 2005/0091613 A1 * | 4/2005 | Camara et al. ................. 715/825 |
| 2005/0108644 A1 | 5/2005 | Finke-Anlauff et al. |
| 2005/0216524 A1 | 9/2005 | Gomes et al. |
| 2006/0206888 A1 * | 9/2006 | Mavrinac et al. ............. 717/168 |
| 2006/0224943 A1 | 10/2006 | Snyder et al. |
| 2007/0100829 A1 | 5/2007 | Allen et al. |
| 2007/0130007 A1 | 6/2007 | Haberman et al. |
| 2008/0022137 A1 | 1/2008 | Ginter et al. |
| 2008/0114844 A1 | 5/2008 | Sanchez et al. |
| 2008/0295022 A1 | 11/2008 | Valdes et al. |
| 2009/0048978 A1 | 2/2009 | Ginter et al. |
| 2009/0077124 A1 * | 3/2009 | Spivack et al. ............ 707/103 Y |
| 2009/0083641 A1 | 3/2009 | Christy |
| 2009/0083656 A1 | 3/2009 | Dukhon et al. |
| 2009/0276531 A1 | 11/2009 | Myka et al. |
| 2010/0049874 A1 * | 2/2010 | Chene et al. .................. 709/246 |

FOREIGN PATENT DOCUMENTS

| | | | |
|---|---|---|---|
| WO | 2005/101237 A1 | 10/2005 | |
| WO | 2005101237 | * 10/2005 | .............. G06F 17/30 |

OTHER PUBLICATIONS

Drupal Content Management System on Mobile Phone, Nurminen et al., Proceedings of the 5th IEEE Consumer Communications and Networking Conference, Las Vegas, USA, Jan. 10-12, 2008, pp. 1228-1229.

International search report and written opinion for corresponding international application No. PCT/IB2010/052838 dated Oct. 27, 2010, pp. 1-18.

International Preliminary Report on Patentability for related International Patent Application No. PCT/IB2010/052838 date Jan. 12, 2012, pp. 1-10.

* cited by examiner

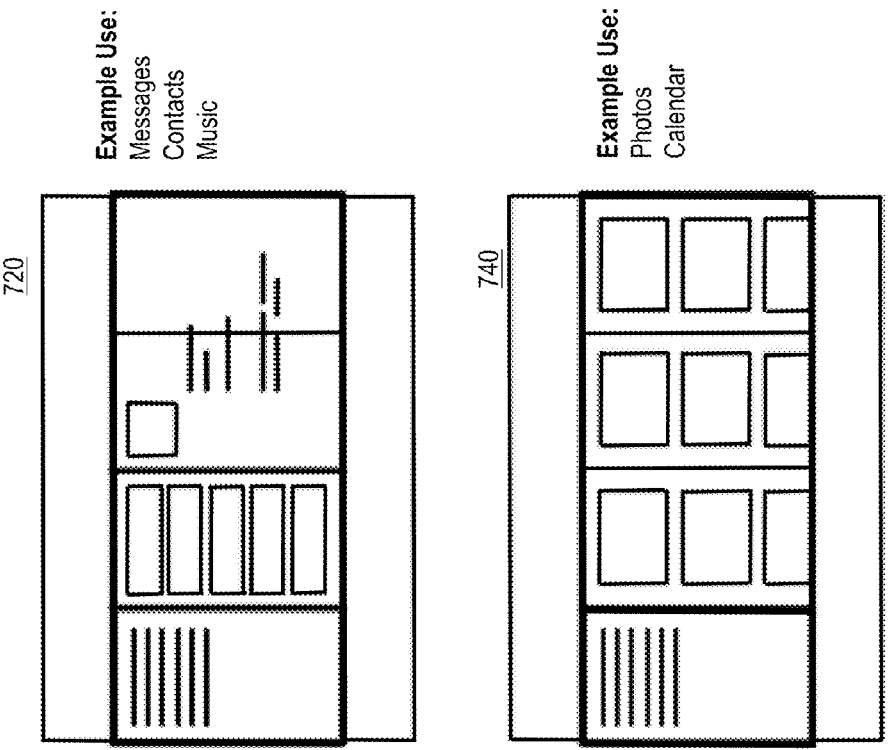
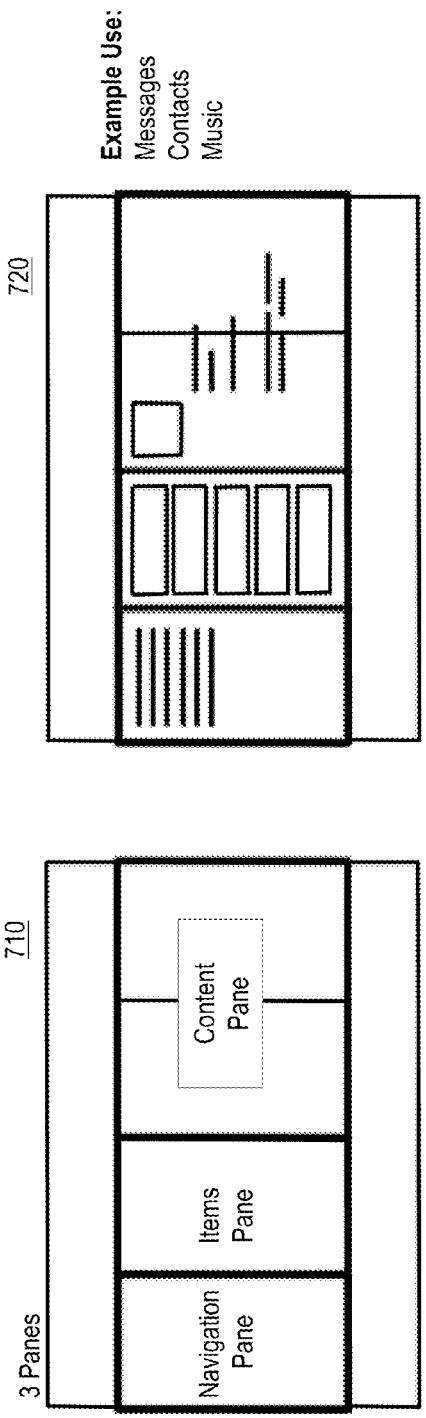
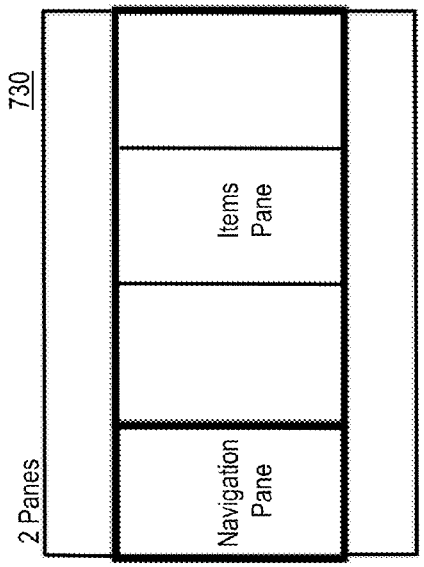
FIG. 7A
FIG. 7B

METHOD AND APPARATUS FOR PROVIDING UNIFORM CONTENT MANAGEMENT

BACKGROUND

Service providers (e.g., wireless and cellular services) and device manufacturers are continually challenged to deliver value and convenience to consumers by, for example, providing compelling network services. One area of interest has been in managing digital content, given the ever growing social networking and content sharing services and communication. However, as the use and variety of communication and mobile Internet services increase, the user faces the burden of downloading, storing, organizing, publishing, and sharing digital content, such as contacts, messages, photographs, animations, videos and music, etc. through different applications and platforms.

SOME EXAMPLE EMBODIMENTS

Therefore, there is a need for an approach for providing uniform content management for a user equipment.

According to one embodiment, a method comprises determining new content from a plurality of content of different categories. The method also comprises initiating presentation of the new content via a graphical user interface that includes: a dashboard providing a layout of the new content, a content manager that is invoked upon selection of a particular one of the new content for managing a group of content of a common category, and a content editor that is invoked upon selection of one of the content in the group for editing the selected content.

According to another embodiment, an apparatus comprising at least one processor, and at least one memory including computer program code, the at least one memory and the computer program code configured to, with the at least one processor, cause the apparatus to determine new content from a plurality of content of different categories. The apparatus is also caused to initiate presentation of the new content via a graphical user interface that includes: a dashboard providing a layout of the new content, a content manager that is invoked upon selection of a particular one of the new content for managing a group of content of a common category, and a content editor that is invoked upon selection of one of the content in the group for editing the selected content.

According to another embodiment, a computer-readable storage medium carrying one or more sequences of one or more instructions which, when executed by one or more processors, cause an apparatus to determine new content from a plurality of content of different categories. The apparatus is also caused to initiate presentation of the new content via a graphical user interface that includes: a dashboard providing a layout of the new content, a content manager that is invoked upon selection of a particular one of the new content for managing a group of content of a common category, and a content editor that is invoked upon selection of one of the content in the group for editing the selected content.

According to another embodiment, an apparatus comprises means for determining new content from a plurality of content of different categories. The apparatus also comprises means for initiating presentation of the new content via a graphical user interface that includes: a dashboard providing a layout of the new content, a content manager that is invoked upon selection of a particular one of the new content for managing a group of content of a common category, and a content editor that is invoked upon selection of one of the content in the group for editing the selected content.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 7A-7B are layouts of the middle section of the content manager screen of FIG. 6, according to various embodiments;

DESCRIPTION OF SOME EMBODIMENTS

A method and apparatus for providing uniform content management for a user equipment are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although various embodiments are described with respect to a uniform content management platform supporting a user equipment, it is contemplated that the approach described herein may be used with other content management platforms supporting a public entity or a private enterprise.

Figure 1:
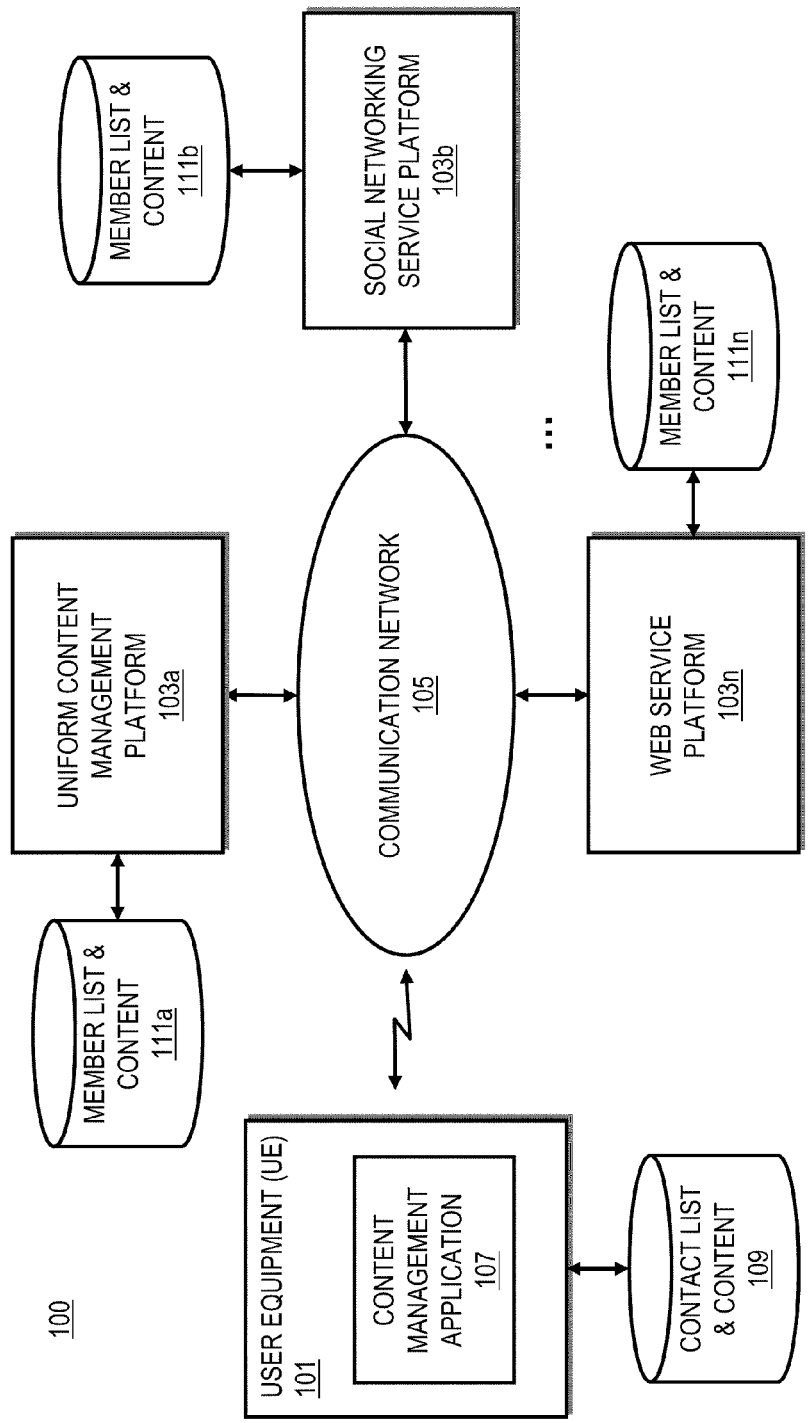
FIG. 1 is a diagram of a system capable of providing uniform content management for a user equipment, according to one embodiment.

FIG. 1 is a diagram of a system capable of providing uniform content management for a user equipment, according to one embodiment. Conventional content management systems are used by industries for collaboratively creating, storing, controlling, versioning, and publishing industry-specific documentation such as news articles, operators' manuals, technical manuals, sales guides, and marketing brochures. The content managed may include computer files, image media, audio files, video files, electronic documents, and Web content. There are various known terms in this area: Web Content Management, Digital Asset Management (DAM), Digital Records Management, Electronic Content Management, etc.

For example, a conventional digital asset management system includes tasks and decisions surrounding ingesting, annotating, cataloguing, storage and retrieval of digital assets, such as digital photographs, animations, videos and music. DAM systems implement customized digital asset management systems that allow targeted users (e.g., designers, librarians, etc.) to archive, search, and access all content based on a vast number of criteria, as well protect the content with permissions and security controls. These DAM systems are customized for each company for its unique digital asset management needs for brand asset management, library-oriented management for cataloging content, and production-oriented management for frequently used and changed digital media. These systems can be overly complex, as to burden consumers with having to navigate various screens and/menus to download, rename, back up, organize/group, save, and export digital content.

To address this problem, a system 100 of FIG. 1 introduces the capability to provide uniform content management for a user equipment without cluttering the screen with every available option. Such uniform content management approach can present only the relevant tools/applications for the particular content.

As shown in FIG. 1, the system 100 comprises a user equipment (UE) 101 having connectivity to a uniform content management platform 103*a*, a social networking service platform 103*b* and a web service platform 103*n* via a communication network 105. By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, mobile ad-hoc network (MANET), and the like.

The UE 101 is any type of mobile terminal, fixed terminal, or portable terminal including a mobile handset, station, unit, device, multimedia tablet, Internet node, communicator, desktop computer, laptop computer, Personal Digital Assistants (PDAs), or any combination thereof. It is also contemplated that the UE 101 can support any type of interface to the user (such as "wearable" circuitry, etc.).

As seen, the UE 101 includes a content management application 107 that interfaces with a contact list and content database 109. Further details of content management application 107 are provided with respect to FIG. 2. Each of the platforms 103*a*-103*n* maintains a member list and content database 111*a*-111*n*, respectively.

By way of example, the UE 101, the uniform content management platform 103*a*, the social networking service platform 103*b* and the web service platform 103*n* communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Figure 2:
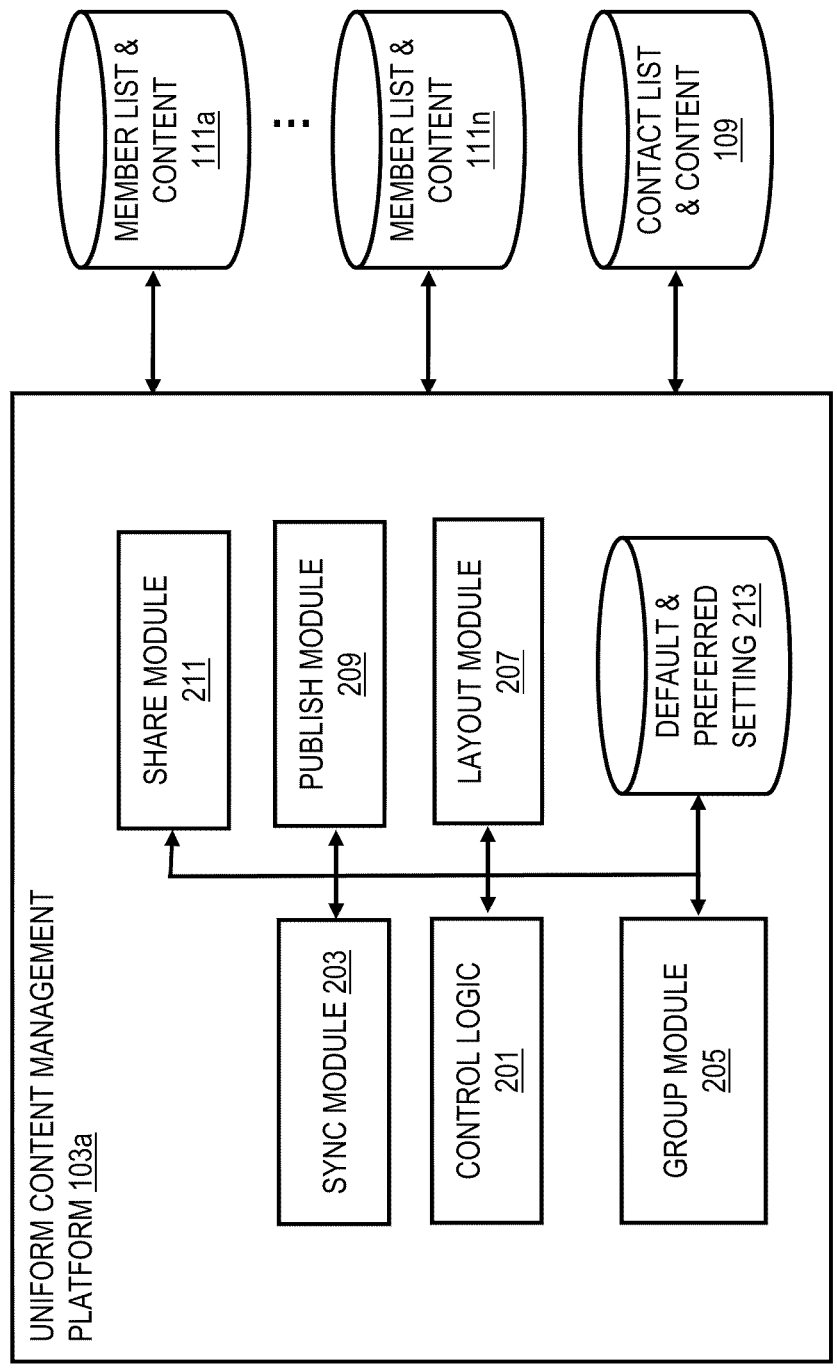
FIG. 2 is a diagram of the components of the uniform content management platform, according to one embodiment.

FIG. 2 is a diagram of the components of the uniform content management platform, according to one embodiment. By way of example, the uniform content management platform 103*a* includes one or more components for providing uniform content management supporting a user equipment. It is contemplated that the functions of these components may be combined in one or more components or performed by other components of equivalent functionality. In this embodiment, the uniform content management platform 103*a* includes at least a control logic 201 that executes at least one algorithm for executing functions of an architecture of the uniform content management platform 103*a*, a synchronization (sync) module 203 for automatically synchronizing new content between the UE 101 and the platforms 103*a*-103*n* according to various embodiments, a group module 205 for grouping the new content on at least one of the UE 101 and the platforms 103*a*-103*n*, and a layout module 207 for presenting the new content on at least one of the UE 101 and the platform 103a. Additionally, a publish module 209 is provided for automatically publishing the new content according to default settings on a website, along with a share module 211 for automatically sharing the new content according to default settings between two or more user equipments. Further, the platform 103a includes a default and preferred settings database 213 for storing default setting configured by platform 103a as well as preferred settings set via the UE 101.

Alternatively, the functions of the uniform content management platform 103a can be implemented via a uniform content management application (e.g., widget) 107 in the user equipment 101 according to another embodiment. Widgets are light-weight applications, and provide a convenient means for presenting information and accessing services. It is contemplated that the functions of these components may be combined in one or more components or performed by other components of equivalent functionality. In this embodiment, the uniform content management application 107 includes at least a control logic which executes at least one algorithm for executing functions of an architecture of the uniform content management platform 103a, a sync module for automatically synchronizing new content between the UE 101 and the platforms 103a-103n according to various embodiments, a group module for grouping the new content on at least one of the UE 101 and the platforms 103a-103n, a layout module for presenting the new content on at least one of the UE 101 and the platform 103a, a publish module for automatically publishing the new content according to default settings on a website, a share module for automatically sharing the new content according to default settings between two or more user equipments, and a default and preferred settings database for storing default setting configured by the uniform content management platform 103a and preferred settings set via the UE 101. To avoid data transmission costs as well as save time and battery, the control logic can fetch data cached or stored in its own database, without requesting data from any servers or external platforms, such as the uniform content management platform 103a, the social networking service platform 103b and the web service platform 103n. Typically, if the user equipment is online, data queries are made to online search server backends, and once the device is off-line, searches are made to off-line indexes locally.

Figure 3:
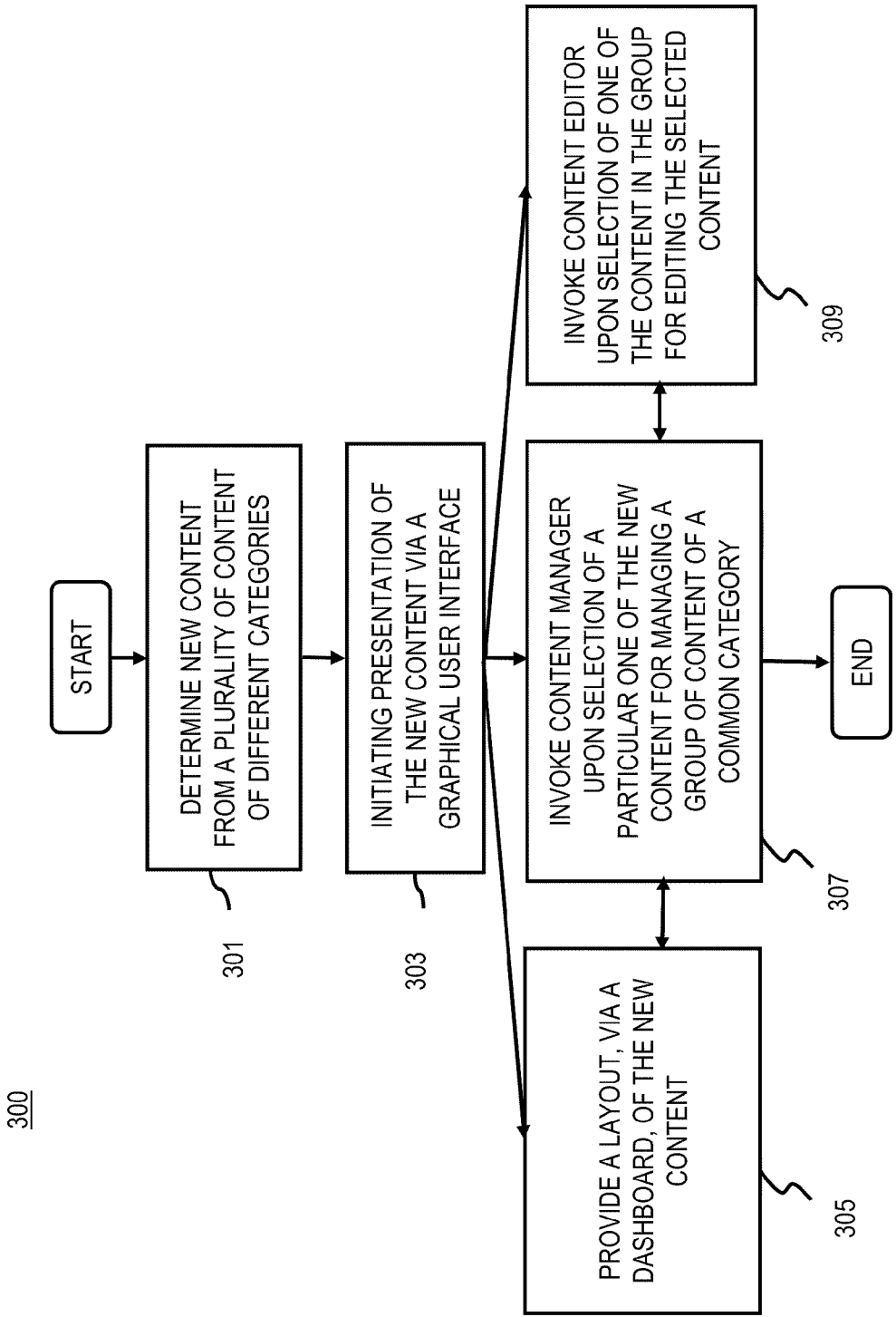
FIG. 3 is a flowchart of a process for providing an architecture of the uniform content management platform, according to one embodiment.

FIG. 3 is a flowchart of a process for providing an architecture of the uniform content management platform 103a, according to one embodiment. In one embodiment, the uniform content management platform 103a performs the process 300 and is implemented in, for instance, a chip set including a processor and a memory as shown FIG. 12. In Step 301, the uniform content management platform 103a determines new content from a plurality of content of different categories. In Step 303, the uniform content management platform 103a initiates presentation of the new content via a graphical user interface that includes: a dashboard providing a layout of the new content (Step 305), a content manager that is invoked upon selection of a particular one of the new content for managing a group of content of one category (Step 307), and a content editor that is invoked upon selection of one of the content in the group for editing the selected content (Step 309). The dashboard, the content manager and the content editor can be present simultaneously or individually as a user desires.

Figure 4:
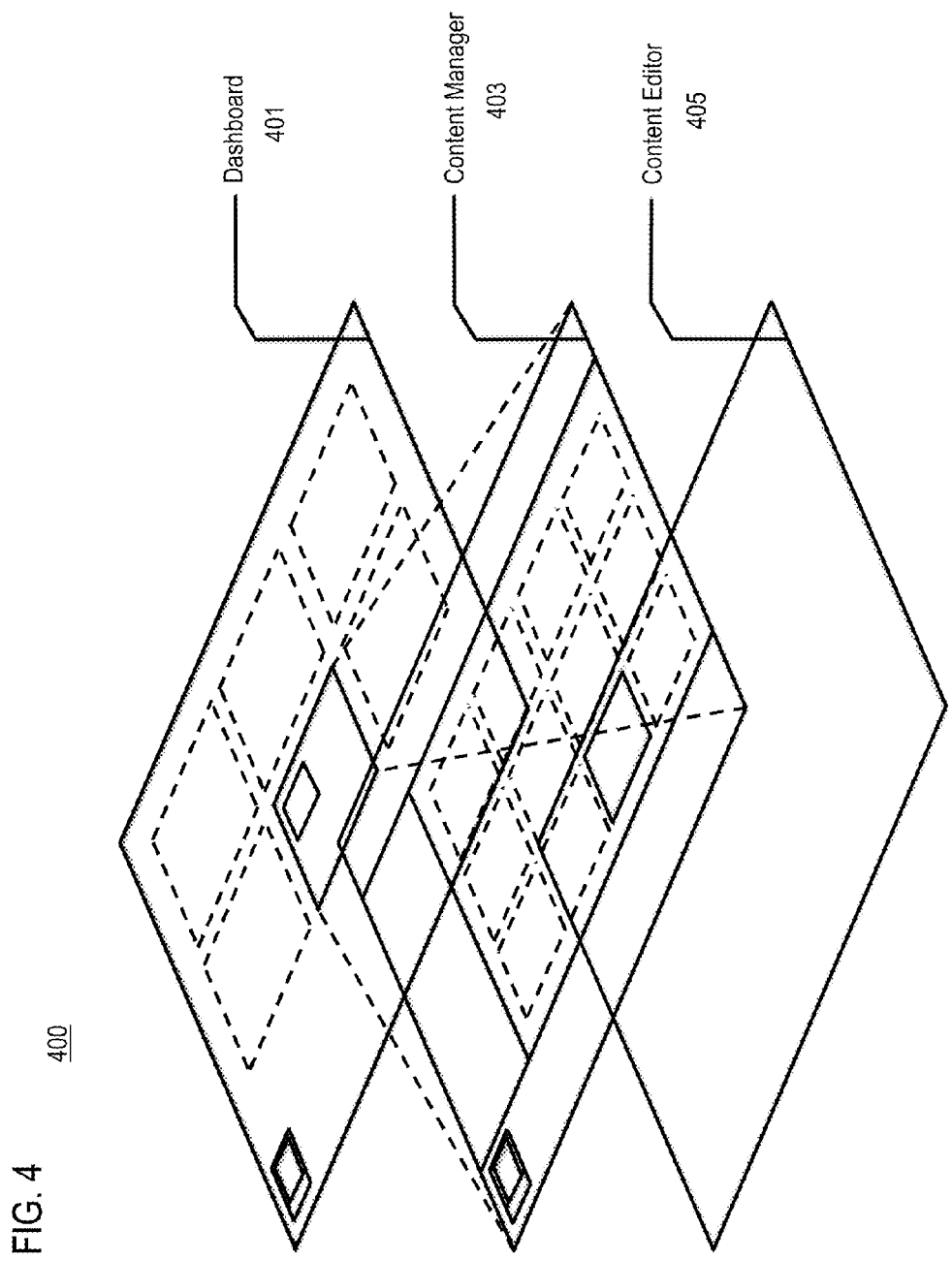
FIG. 4 is a diagram of the architecture of the platform of FIG. 3, according to one embodiment.

FIG. 4 is a diagram of the architecture of the uniform content management platform 103a of FIG. 3, according to one embodiment. In this example, the architecture of platform 400 includes three integrated and interdependent layers: a dashboard 401, a content manager 403 and a content editor 405. The dashboard 401 provides users an at-a-glance overview of the current state of all content types/categories, such as contacts, massages, photos, music, etc. According to certain embodiments, the contents are the most recent or updated contents, so that the user is provided with new information. The content manager 403 enables the users to manage groups of content, by, for example, manually moving content to or from the platform 103a. The content editor 405 allows the user to view and edit content details. In one embodiment, the platform 103a allows the users to bold digital content items, and to freely transfer digital content items among the three layers via one consolidated application.

Such uniform content management approach, in one embodiment, presents only the relevant tools/applications for the particular content. By way of example, when the user selects by a mouse arrow or a touch in the dashboard view, a content item shown therein disappears from the background once it becomes irrelevant, and the next content item meeting the criteria (e.g., a time stamp) is shown instead. According to certain embodiments, at least two or more (e.g., ten) content items that rotate in the contacts, messaging, photos, music windows on the dashboard 401.

Each content type has its own module on the dashboard 401 where users can get an at-a-glance of the current state of all content at once. In certain embodiments, a module has different modes that depend on the context and associated activates. The following tabs of the dashboard 401 provide different functions as shown in Table 1.

TABLE 1

| Function | Description |
| --- | --- |
| Connect | An emotional connection to recently updated/changed content gets reinforced when it bubbles up to the surface. |
| Copy & Sync | Suites that are set to automatically synchronize will cycle through as they are synchronizing between the user equipment and a computer. |
| Mashup | This is the place where all the suites exist at once. One module could drive the others. |
| Buzz | Content shows up on the surface via a smart group system. These could be, e.g., recent chats, newest photos or unreturned calls. |
| Pile | Users plug in their phone and on this screen they can see the new photos pile up, ready to import. |

The content manager 403 allows the user to view what content is where, organize content into groups, and move content between the user equipment and the computer. The following tabs of the content manager 403 provide different functions as shown in Table 2.

TABLE 2

| Function | Description |
| --- | --- |
| Bridge | Users navigate between content types using the bridge. |
| Groups | Content is organized using a simple system of groups. Several relevant smart groups exist for each suite. Users can create their own groups or smart groups and sync them individually with their devices. Groups can also be elevated to the dashboard. |

TABLE 2-continued

| Function | Description |
| --- | --- |
| Device | At all times users can see what is on their device (e.g., user equipment) as easily as navigating their PC. The device switcher allows users to switch between devices (e.g., a mobile phone, a digital camera, a PDA) if more than one is plugged in, and the platform 103a as elements come online and are accessible. |

The content editor 405 provides the user with the fine details with the digital content, such as editing photos before getting sent out, adding the photos to a reply to a text message.

The platform 103a offers different ways to transfer content, provide default copy and synchronize ("copy & sync") settings, and clearly communicates the transfer process. The platform 103a provides a simple yet versatile copy & sync model, to support different users' preferences for content transfer. The platform 103a considers multiple emotional factors which influence a user's choices for how the user wants to copy & sync between the user equipment and the computer. From a technical perspective, the size of the media type is the most important factor. A second factor is the frequency of engagement with content and the subsequent frequency of changes to that content. Contacts and calendar functions are good candidates for auto-sync because they change regularly. A third factor is the ease of recovery of the content. It is note that the more difficult a piece of content is to recover, the more likely the user wants to manually control over its movement across devices as to ensure it is protected. A fourth factor is the value of media. Some media has high personal value, and thus is treated with more care, in order to protect it. For instance, one-of-a-kind photos and videos are more valuable than music files that can be repurchased or borrowed from a friend. Conventionally, sync technology has been unreliable, either losing all their data or having it all duplicated, such that they are reluctant to use syncing function. Similarly, if users do not understand how the technology works, they default to wanting control.

Figure 5A:
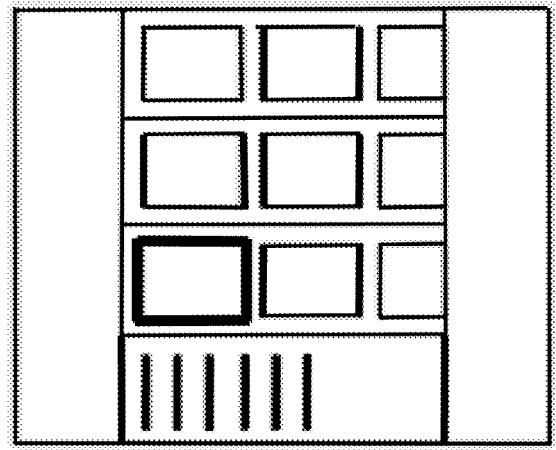
FIG. 5A-5C are diagrams of user interfaces of the platform utilizing a synchronization process, according to various embodiments.
Figure 5B:
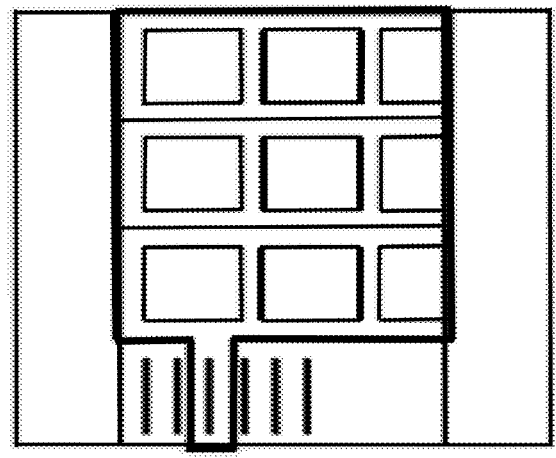
Figure 5C:
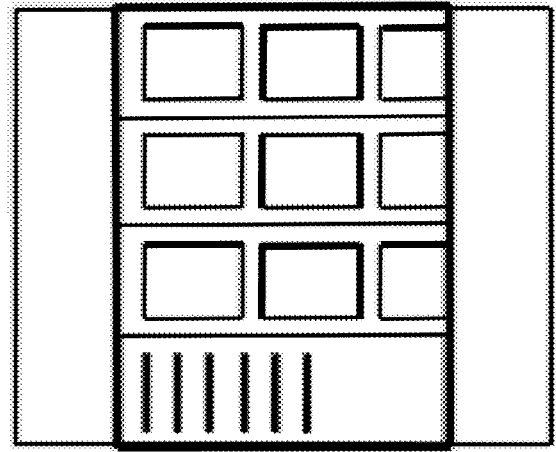

FIGS. 5A-5C are diagrams of user interfaces of the platform utilized in the processes of FIG. 3, according to various embodiments. The user can manually copy items from the user equipment to the computer and vice versa. This interaction takes places on the content manager level, where users select and then drag and drop content to a desired location. Groups can be copied from or to the user equipment (on the condition that the user equipment supports groups). According to certain embodiments, sync (synchronization) is the process of reconciling the differences between a file stored in one location and a copy of the same file stored in another location. In one-way sync, files are copied from a primary location to a secondary location, but never copied back to the primary location. In two-way sync, files are copied in both directions, keeping the two locations in sync with each other. Automatic sync starts when users connect the user equipment to network. The user can cancel the transfer. Manual sync is initiated by the user and the user decides the timing to sync.

Synchronization can occur at the dashboard level. For example, protocol-independent multicast (PIM) content (e.g., contacts, messages and calendar) can be synced on content type level. Other content types such as photos could be set to sync entirely. FIG. 5A shows the marking of a sync at the content type level (e.g., photos), including a check mark for "Sync" tab, and a highlight border of the sync content. Individual groups within a content type can be set to sync. FIG. 5B shows the marking of a sync of the third group of the content type level, including check marks for "Copy" and "Sync" tabs, and a highlight border of the third group as the sync content. For the current situation where not many devices support groups for contacts, users can keep one of the social groups in sync with the "All" group on the user equipment. The user can copy individual items. Alternatively, in order to prevent the burden of micro managing to content, an individual item cannot be set to sync but yet set to copy. FIG. 5C shows the marking of a sync of one content item at the content type level (e.g., a photo), including a check mark for "Copy" tab, and a highlight border of the photo. Limiting sync settings to content types and groups makes it easy for users to keep track of content in different locations.

The platform 103a provides default copy & sync settings that are optimized for the majority of users and reduce the number of decisions users have to make in order to use the application. Users are introduced to the default copy & sync settings when they use the platform 103a for the first time. The platform 103a guides users through the settings. To set the correct expectations, it is crucial to explain what will happen in simple text and images. Both users with specific demands can opt out by choosing to manage content manually.

The dashboard 401 shows the settings the users have selected, conveying visually what contents are present rather than relying on text. Under this scenario, at all times, the user sees what settings the user has selected by "flipping" the dashboard module over. Adjustments to the settings can be made immediately. The platform 103a provides transparency and control in the content transfer settings. By way of example, if one default setting is to "keep my contacts up to date on my phone, my computer and the platform 103," the platform 103 sets an automatic two way sync between the phone and the computer, and to sync PIM data to the platform 103, such that three platforms are equal and the users only have to change data in one of the three platforms (e.g., adding or editing a contact). The user will have two backups of his/her most recent address book in case he/she loses the user equipment (e.g., phone, laptop, etc.). Alternatively, the user can opt out of the default setting by selecting "Manage Contacts manually."

Another default setting is to "Copy new photos on my phone to my computer." The platform 103 starts one way sync from the phone to the PC. The user can publish photos on the platform 103 manually. The platform 103 makes it effortless for the user to have a safe copy of all the photos on the computer. Alternatively, the user can opt out the default setting by selecting "Manage Photos manually."

Another default setting is to "save and read my messages on my computer." The platform 103 starts automatic one way sync between the phone and the computer. Deleted messages on the computer get deleted on the phone when the phone is connected to the network. However, deleted messages on the phone are not deleted from the computer. Messages can only be sent if the phone is connected to the network. Alternatively, the user can choose another setting other than the default setting by selecting "Manage Messages manually." Another default setting is to "keep the playlists on my phone and my computer up to date." Music purchases through an online music store is easily copied to the phone. Synchronized playlists get automatically updated in into the phone. Again, the user can opt out the default setting by selecting "Manage Music manually."

By way of example, a user ("Claire") wants to copy only specific photos from her phone to the platform 103a. During the first time use, she has accepted the default settings for Photos. When she connects her phone to the platform 103a, new photos pile up on the photos module in the dashboard 401. Usually, she copies all new photos, but this time she knows there are some bad-quality ones; so she skips the import step on the dashboard 401 and jumps directly to the Content Manager 403 to view the photos stored in her phone in a grid where she can select the best photos to copy by dragging them to the desired destination in the platform 103a. She takes advantage of the big screen of the platform 103a, by deleting the ones she does not want import from her phone.

As another example, Bob has 650 contacts in the platform 103a and does not want to sync all of them to his phone. Although Bob's phone does not support contact groups, there's still a way not to sync all his contacts. By creating a contacts group called "Phone Contacts," Bob drags the "Phone Contacts" onto the phone. Because the "All" group on the phone is not set to sync yet, a dialog box asks him "Do you want to keep the group Phone Contacts in sync?" He clicks the Yes button. The platform 103a then associates the group "Phone Contacts" in the platform 103a with the all contacts on the phone and keeps the two in sync. When he rolls over the synced group "Phone Contacts", the same group on the phone is highlighted, indicating they are synced. He drags only the contacts he wants to have access to on his phone into this newly synced group.

Figure 6:
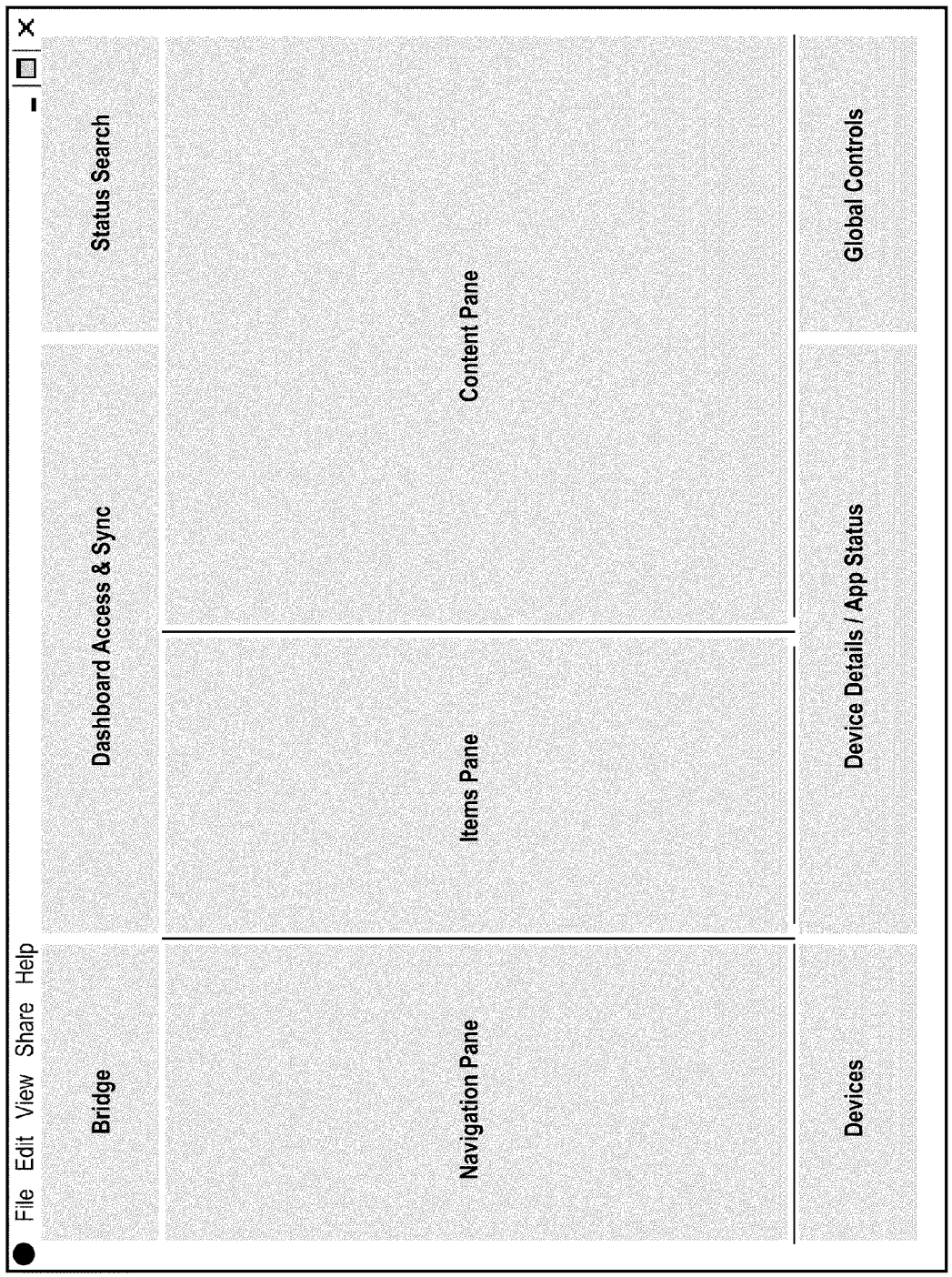
FIG. 6 is a diagram of a content manager screen of the platform, according to one embodiment.

FIG. 6 is a diagram of a content manager screen 600 of the platform, according to one embodiment. The top and bottom rows of the Content Manager screen 600 are used to display controls and status information. The center row presents the content and ways to navigate the content. The Bridge is the highest level of navigation on the Content Manager screen and is used to navigate between content types. The Bridge shows users where they are and which content type they are currently viewing. The Dashboard icon lets users switch to the Dashboard screen. When content is being copied or synced, a progress bar is displayed next the Dashboard icon, indicating sync status. In this example, the global search field is located in the right upper corner of the screen. The Navigation Pane allows users to browse the selected content type. The Items Pane shows a list or grid view of items. The Content Pane is used to display item details or a mode to edit item details. Connected devices appear in the left bottom corner of the screen. Space is reserved to display additional device details or application related status information in the status field. If needed, Global Controls such as a music player can be visible in the right bottom of the screen.

FIGS. 7A-7B are layouts of the middle section of the content manager screen of FIG. 6, according to various embodiments. The layout of the framework components in the middle section is optimized per content type to support users' needs. The layout changes per content type. These two different views support specific behaviors for different content types based on most frequently used two panes activities of users. FIG. 7A shows three panes; the three pane layout 710 contains the Navigation Pane, Items Pane and Content Pane. This layout is used to browse contacts, messages or music by allowing a quick overview of content in the Items Pane, while in the same screen showing content details in the Content Pane as depicted in the screen 720. Contacts can be edited from the three pane view. New Messages get created from the three pane view as well.

FIG. 7B shows two panes, in which the two pane layout 730 contains the Navigation Pane and a wide Items Pane. This view is used for photos or a calendar to provide an overview of the content as depicted in the screen 740. Details of individual items are available after double click. A photo can be edited in the Content Pane, but will be shown full screen in a slideshow when double clicking on it.

Figure 8:
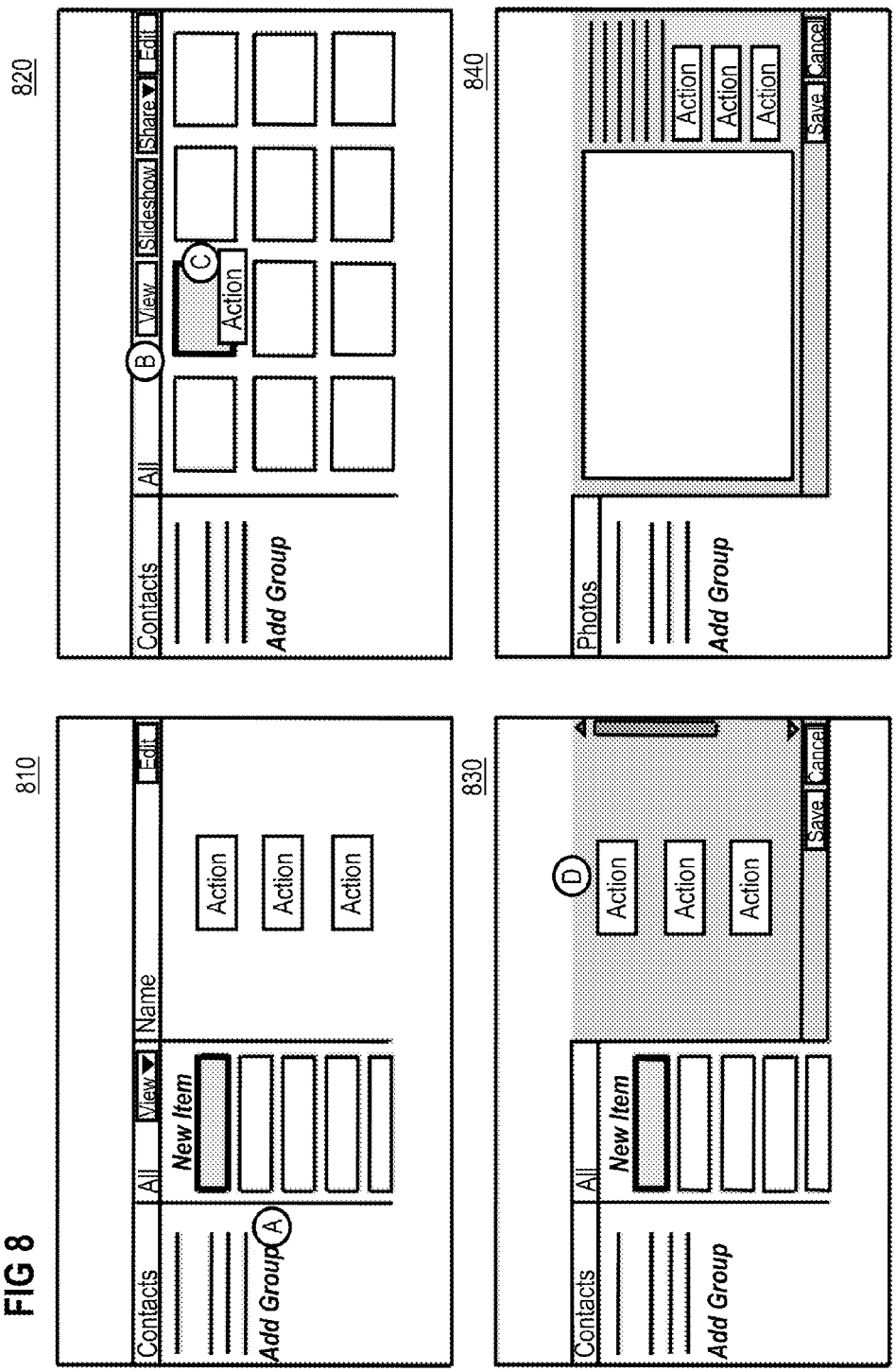
FIG. 8 includes diagrams of user interfaces of the platform utilized in the processes of FIG. 3, according to various embodiments.

FIG. 8 includes diagrams of user interfaces of the platform utilized in the processes of FIG. 3, according to various embodiments. The platform 103a positions Actions where they are relevant. By way of example, Actions within the Navigation or Items Panes, such as "Add Group A," are presented in the lists as shown in a contact screen 810 of the three-pane layout and close to the highlighted "New Item." The Header row (with Pane titles like "Contact" and "All") is the place for actions that have an effect on the view of the two-pane layout could have a drop down menu with different sharing options like "Email", "Shared on Platform 103a" or "Published on Facebook®". Additional actions are presented in context which can be a "send message" shortcut to messages in Contacts, or a "Rotate" button that shows up when users roll-over an image in the grid highlight as C in the Screen 820.

According to certain embodiments, user created or selected content items can be set to "visible" to share between the platform 103a and the user's accounts with social network websites (e.g., Facebook® or Twitter®) to link the user with social networking applications. One approach to initiate the sharing is via signing in the social network websites by the user. Another approach to initiate the sharing is via running the platform 103a, which has knowledge on the user accounts with the social network websites. When the account data match, the content items are exchanged between the platform 103a and the social network websites. In one embodiment, the sharing is conducted over the platform 103a, after the user has given access details regarding the platform 103a to the social network websites so that specific data or sources from the platform 103a can be exchanged. As such, the user can manage the social networking applications from one single platform 103a. By way of example, the platform 103a updates a function of "Now Playing" music to the social network websites.

In the Edit mode, there are no buttons in the content pane header. The "Save" and "Cancel" buttons are presented at the bottom of the content pane. As the Western user typically reads text and fills in fields from left to right and from top to bottom, the most logical place for buttons of the above-mentioned kind is at the lower right corner. Actions D that modify the item are presented in the main part of the content pane a contact screen 830 of the 3-pane layout. By analogy, actions that modify the item are presented in the main part of the content pane a contact screen 840 of the 2-pane layout.

Figure 9:
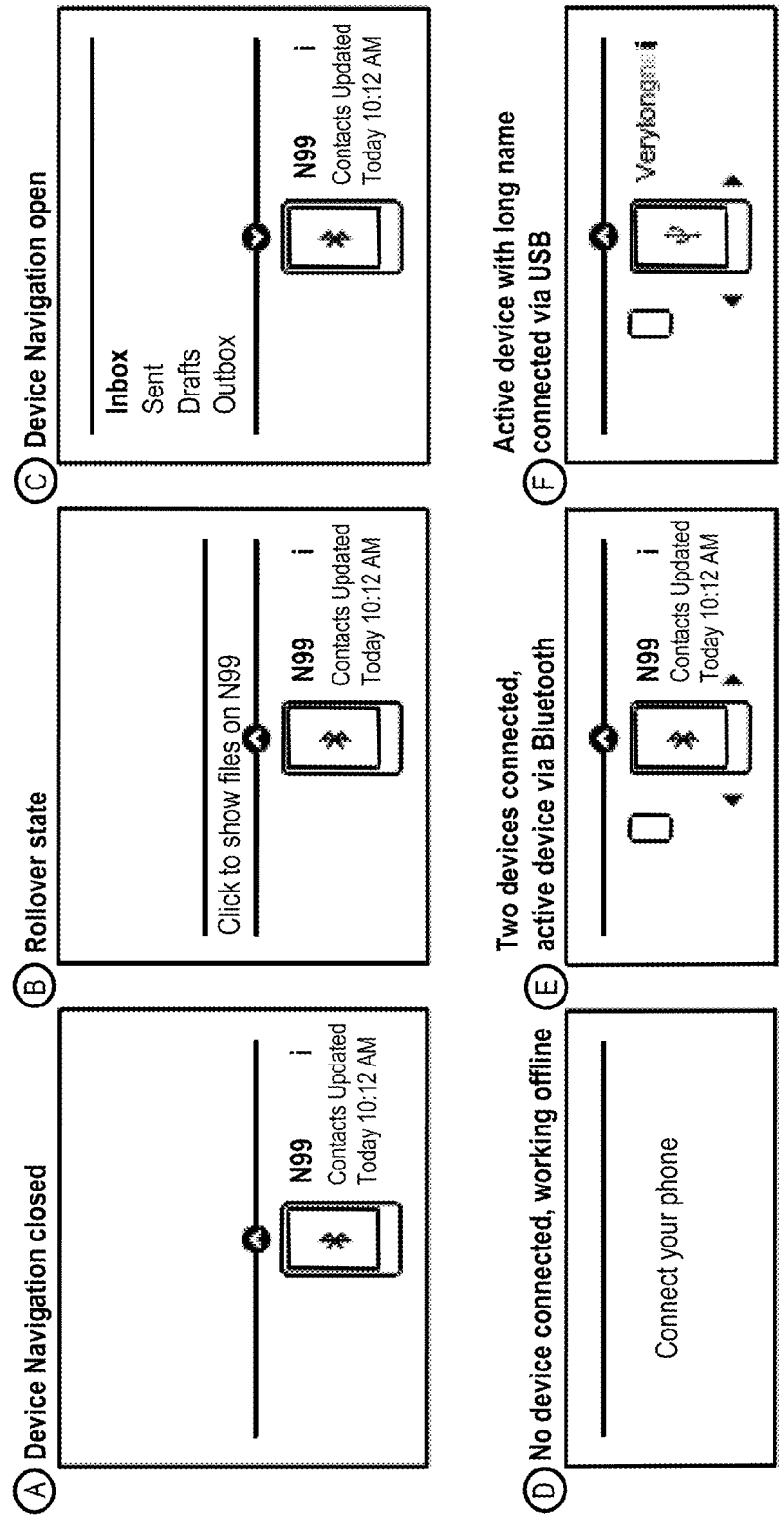
FIG. 9 includes user interfaces of a user equipment utilized in the processes of FIG. 3, according to one embodiment.

FIG. 9 includes user interfaces of a user equipment utilized in the processes of FIG. 3, according to one embodiment. A user sets up an account with the platform 103a during the first time use. Thereafter, the user can be logged in to the platform 103a by default whenever the content management application 107 is open, unless the user chooses logs out or closes the platform 103a. After logging out of the platform 103a, the user can sign in to update content on the platform 103a.

When a user equipment 101 is connected to the platform 103a, an image appears with the name of the device (e.g., "N99") and copy & sync status (e.g., "Contacts updated Today 10:12 AM") on the screen "A" of the user equipment. By default, a Device Navigation Pane is closed at the user equipment. According to one embodiment, the copy & sync status is contextual to the content type and always shows the latest update, except the first time use, in which the prompt "Contacts have not been updated yet" may be used. In the screen "B," the user roll-over device image, title or arrow to see hint can be visible by default during the first time of use. In the screen "C," the Device Navigation Pane showing "Inbox, Sent; Drafts; Outbox" is open at the user equipment 101, by selecting the device image, title or arrow. When the platform 103*a* presents information on the user equipment 101 (i.e., photos for manual import), the Device Navigation Pane will be displayed automatically and stay open until the user closes the pane.

In another scenario, when the user equipment 101 works offline and is not connected to the network and the platform 103*a*, nothing is displayed in the Screen "D". When the user equipment 101 is connected to another device via Bluetooth, a Bluetooth icon and a "☐" sign show up on the screen "E". When the user equipment 101 is connected to another device via USB, a USB icon and a "␣" sign show up on the screen "F".

Figure 10:
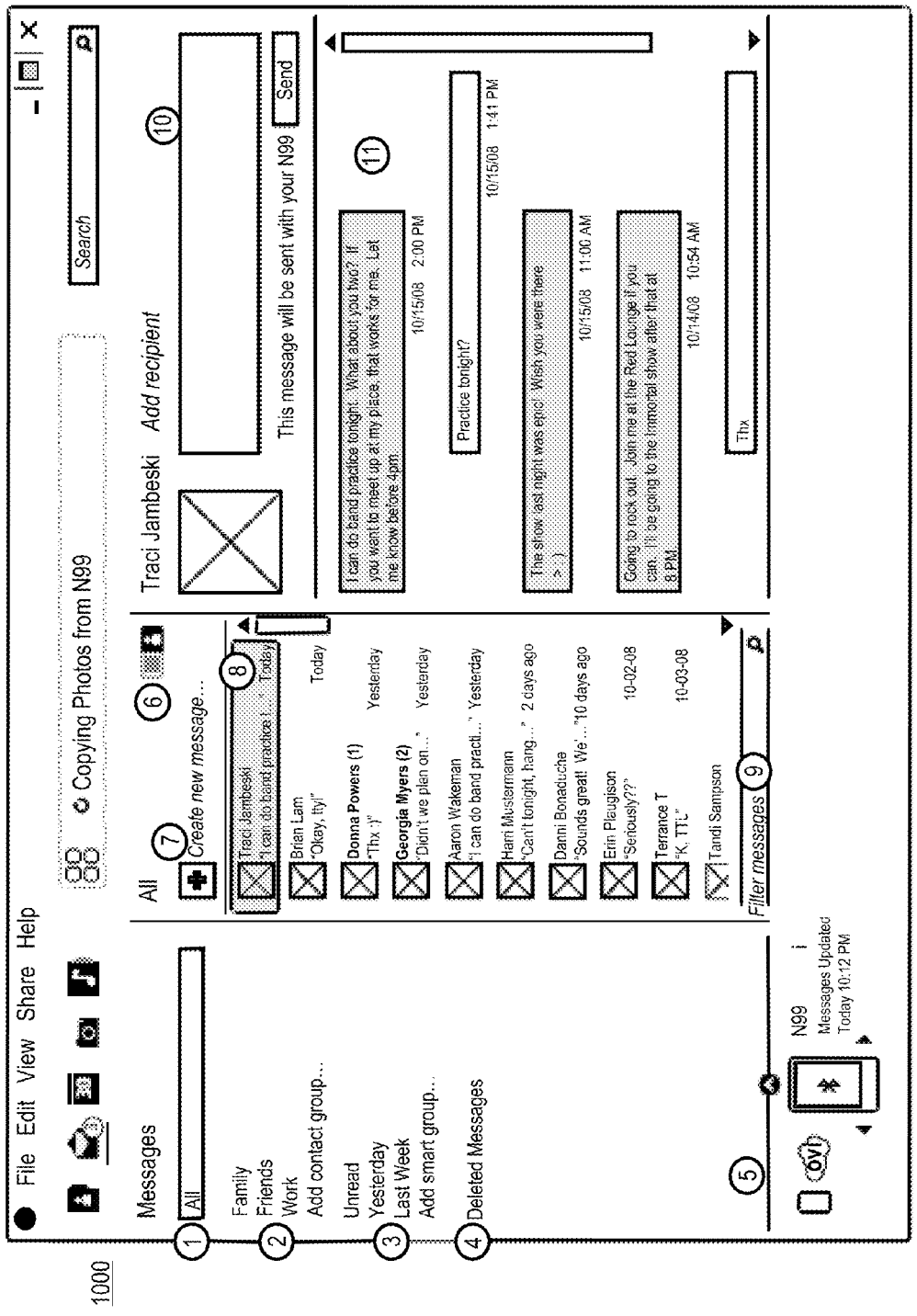
FIG. 10 shows a user interface of the platform utilized in the processes of FIG. 3, according to one embodiment.

FIG. 10 shows a user interface 1000 of the platform 103 utilized in the processes of FIG. 3, according to one embodiment. By way of example, a user can readily view, reply and create new messages within the platform 103*a*. Groups are virtual collections of individual items that do not occupy device memory or space on the hard drive. Instead, an item in a group is an alias to the original file. Since group items are aliases, an item can be associated with multiple groups. Users can create, select, edit, delete and sync groups in the Navigation Pane. In this example, there are four different types of groups: Bullet Point 1 "All" refers to a default master group that cannot be deleted. This group contains all sent and received messages. Any items removed from "All" will be removed from all other groups. Bullet Point 2 refers to Custom contact groups mirror the Contacts section groups. Groups created here get added to the Contacts section. To anticipate users' needs, default groups such as "Favorites" exist. Users can rename and delete default groups or create their own custom groups. Bullet Point 3 refers to Default smart groups. To anticipate users' needs, default smart groups exist. There are smart groups that organize items on default criteria such as chronically, per topic, per contact, per social group, per chat, or time (e.g., yesterday, last week, etc) or communication (e.g., recently added, recently contacted). Users can modify or delete default smart groups or create there own. Bullet Point 4 refers to Deleted messages/items. Users can restore messages/items that they deleted. Within a group category, users can rearrange the order of the list by dragging the group name to a new location in the list. If the user equipment does not support groups, contacts are copied to a flat list. If the user wants to sync more than one group a message should be shown about not being able to select more than one.

Bullet Point 5 refers to Device Pane for browsing messages on a device. The user can switch between devices (or to the platform 103*a*) by clicking on the left and right arrows or clicking on the small device icon "☐" or an "Ovi" icon (representing the platform 103*a*). The user can switch to the platform 103*a* anytime to view content currently stored on the platform 103*a* by switching to the platform 103*a* within the Device Pane. Bullet Point 6 refers to Messages which are always sorted chronologically. Here, users can choose to view messages as a flat list (like the Inbox) or grouped by contact (threaded view) with the toggle button. Bullet Point 7 refers to "Create new message . . . " button. Bullet Point 8 refers to Message item in the Items Pane which includes a contact image (if added), name, and last message sent or received and date sent. Bullet Point 9 refers to Message filtering. The filter tool helps users to find a contact/message in the Items Pane list. For example, when users start typing, the list instantly filters the messages that include the narrowed results. In this manner, the filter can be optimized in such a way that users can find the message they are looking for as efficiently as possible. Filters can search recipient's names as well as any text within messages. Highlighting filtered keywords makes it easy for users to sift through numerous messages.

Bullet Point 10 refers to send a new message area. Bullet Point 11 refers to Messages in a conversation appearing below the send area. Most recent messages appear at the top of the list. Under this arrangement, users can readily know at a glance which message was created by whom, so the selected contact in the Items list has the same background color as the messages created by the same person.

The processes described for providing uniform content management for a user equipment may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 11:
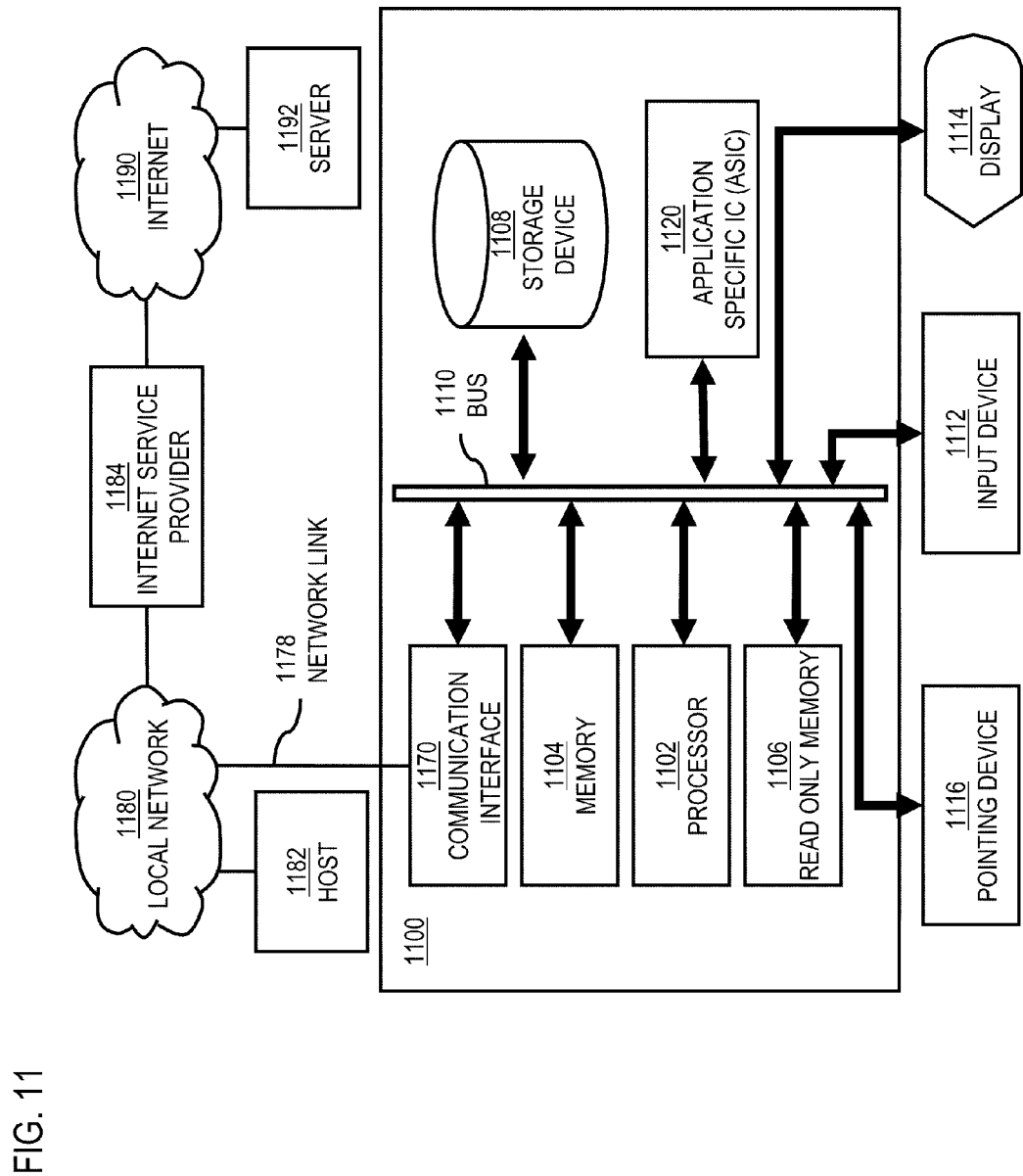
FIG. 11 is a diagram of hardware that can be used to implement an embodiment of the invention.

FIG. 11 illustrates a computer system 1100 upon which an embodiment of the invention may be implemented. Computer system 1100 is programmed (e.g., via computer program code or instructions) to providing uniform content management for a user equipment as described herein and includes a communication mechanism such as a bus 1110 for passing information between other internal and external components of the computer system 1100. Information (also called data) is represented as a physical expression of a measurable phenomenon, typically electric voltages, but including, in other embodiments, such phenomena as magnetic, electromagnetic, pressure, chemical, biological, molecular, atomic, subatomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1110 includes one or more parallel conductors of information so that information is transferred quickly among devices coupled to the bus 1110. One or more processors 1102 for processing information are coupled with the bus 1110.

A processor 1102 performs a set of operations on information as specified by computer program code related to providing uniform content management for a user equipment. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1110 and placing information on the bus 1110. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1102, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1100 also includes a memory 1104 coupled to bus 1110. The memory 1104, such as a random access memory (RAM) or other dynamic storage device, stores information including processor instructions for providing uniform content management for a user equipment. Dynamic memory allows information stored therein to be changed by the computer system 1100. RAM allows a unit of information stored at a location called a memory address to be stored and retrieved independently of information at neighboring addresses. The memory 1104 is also used by the processor 1102 to store temporary values during execution of processor instructions. The computer system 1100 also includes a read only memory (ROM) 1106 or other static storage device coupled to the bus 1110 for storing static information, including instructions, that is not changed by the computer system 1100. Some memory is composed of volatile storage that loses the information stored thereon when power is lost. Also coupled to bus 1110 is a non-volatile (persistent) storage device 1108, such as a magnetic disk, optical disk or flash card, for storing information, including instructions, that persists even when the computer system 1100 is turned off or otherwise loses power.

Information, including instructions for providing uniform content management for a user equipment, is provided to the bus 1110 for use by the processor from an external input device 1112, such as a keyboard containing alphanumeric keys operated by a human user, or a sensor. A sensor detects conditions in its vicinity and transforms those detections into physical expression compatible with the measurable phenomenon used to represent information in computer system 1100. Other external devices coupled to bus 1110, used primarily for interacting with humans, include a display device 1114, such as a cathode ray tube (CRT) or a liquid crystal display (LCD), or plasma screen or printer for presenting text or images, and a pointing device 1116, such as a mouse or a trackball or cursor direction keys, or motion sensor, for controlling a position of a small cursor image presented on the display 1114 and issuing commands associated with graphical elements presented on the display 1114. In some embodiments, for example, in embodiments in which the computer system 1100 performs all functions automatically without human input, one or more of external input device 1112, display device 1114 and pointing device 1116 is omitted.

In the illustrated embodiment, special purpose hardware, such as an application specific integrated circuit (ASIC) 1120, is coupled to bus 1110. The special purpose hardware is configured to perform operations not performed by processor 1102 quickly enough for special purposes. Examples of application specific ICs include graphics accelerator cards for generating images for display 1114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1100 also includes one or more instances of a communications interface 1170 coupled to bus 1110. Communication interface 1170 provides a one-way or two-way communication coupling to a variety of external devices that operate with their own processors, such as printers, scanners and external disks. In general the coupling is with a network link 1178 that is connected to a local network 1180 to which a variety of external devices with their own processors are connected. For example, communication interface 1170 may be a parallel port or a serial port or a universal serial bus (USB) port on a personal computer. In some embodiments, communications interface 1170 is an integrated services digital network (ISDN) card or a digital subscriber line (DSL) card or a telephone modem that provides an information communication connection to a corresponding type of telephone line. In some embodiments, a communication interface 1170 is a cable modem that converts signals on bus 1110 into signals for a communication connection over a coaxial cable or into optical signals for a communication connection over a fiber optic cable. As another example, communications interface 1170 may be a local area network (LAN) card to provide a data communication connection to a compatible LAN, such as Ethernet. Wireless links may also be implemented. For wireless links, the communications interface 1170 sends or receives or both sends and receives electrical, acoustic or electromagnetic signals, including infrared and optical signals, that carry information streams, such as digital data. For example, in wireless handheld devices, such as mobile telephones like cell phones, the communications interface 1170 includes a radio band electromagnetic transmitter and receiver called a radio transceiver. In certain embodiments, the communications interface 1170 enables connection to the communication network 105 for providing uniform content management for the ULE 101.

The term computer-readable medium is used herein to refer to any medium that participates in providing information to processor 1102, including instructions for execution. Such a medium may take many forms, including, but not limited to, non-volatile media, volatile media and transmission media. Non-volatile media include, for example, optical or magnetic disks, such as storage device 1108. Volatile media include, for example, dynamic memory 1104. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Figure 12:
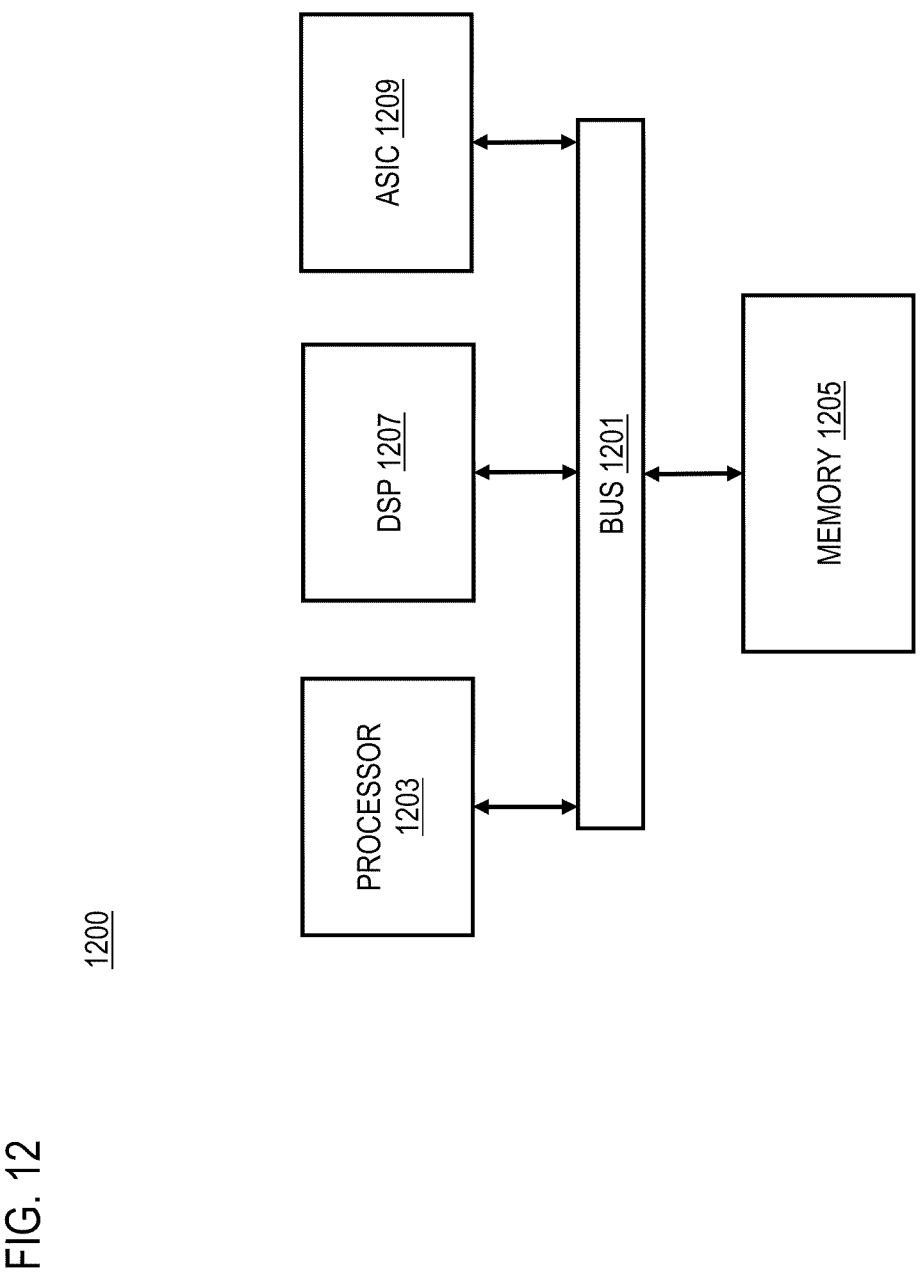
FIG. 12 is a diagram of a chip set that can be used to implement an embodiment of the invention.

FIG. 12 illustrates a chip set 1200 upon which an embodiment of the invention may be implemented. Chip set 1200 is programmed to providing uniform content management for a user equipment as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform the inventive steps described herein to providing uniform content management for a user equipment. The memory 1205 also stores the data associated with or generated by the execution of the inventive steps.

Figure 13:
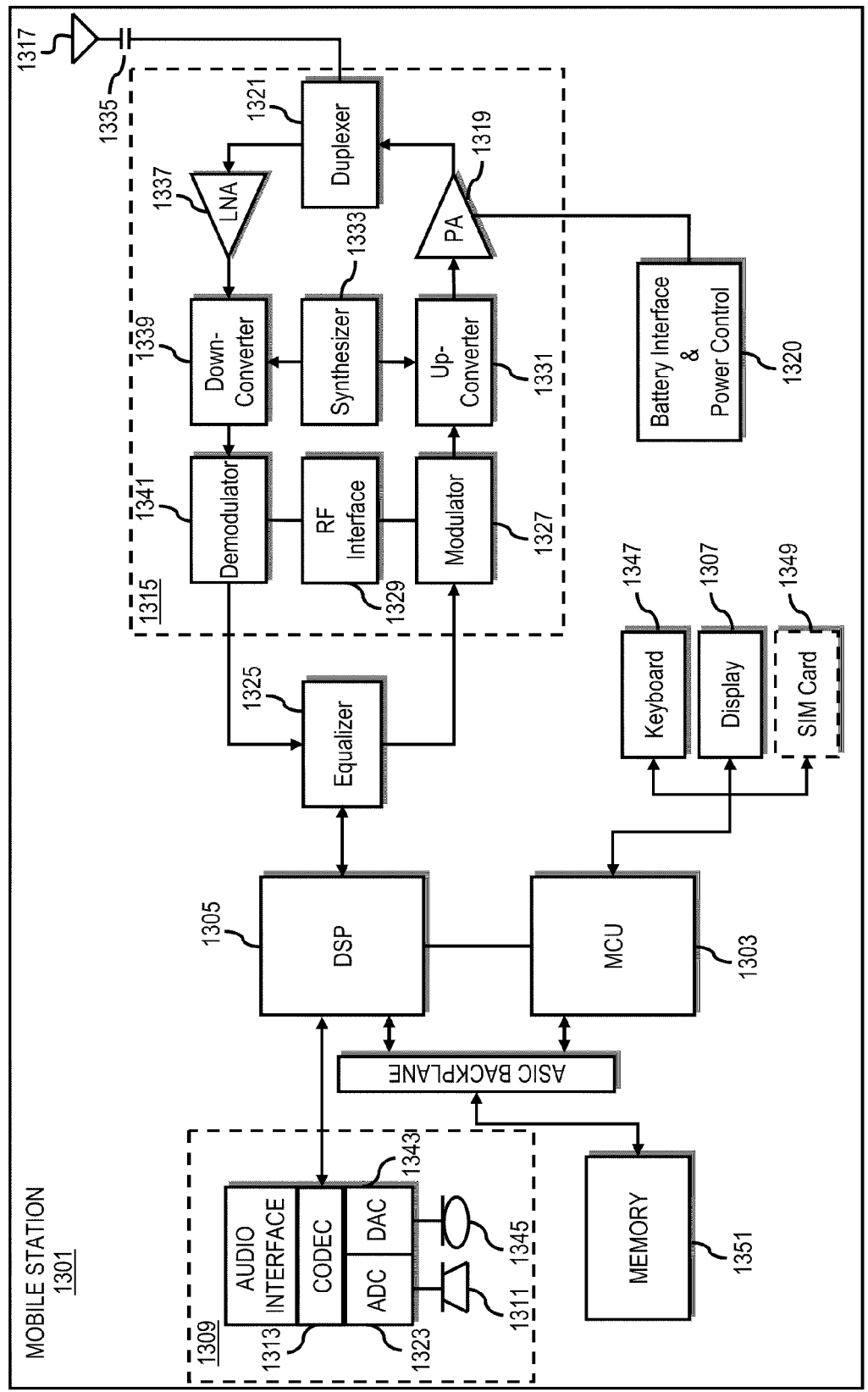
FIG. 13 is a diagram of a mobile station (e.g., handset) that can be used to implement an embodiment of the invention.

FIG. 13 is a diagram of exemplary components of a mobile station (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1303, a Digital Signal Processor (DSP) 1305, and a receiver/transmitter unit including a microphone gain control unit and a speaker gain control unit. A main display unit 1307 provides a display to the user in support of various applications and mobile station functions that offer automatic contact matching. An audio function circuitry 1309 includes a microphone 1311 and microphone amplifier that amplifies the speech signal output from the microphone 1311. The amplified speech signal output from the microphone 1311 is fed to a coder/decoder (CODEC) 1313.

A radio section 1315 amplifies power and converts frequency in order to communicate with a base station, which is included in a mobile communication system, via antenna 1317. The power amplifier (PA) 1319 and the transmitter/modulation circuitry are operationally responsive to the MCU 1303, with an output from the PA 1319 coupled to the duplexer 1321 or circulator or antenna switch, as known in the art. The PA 1319 also couples to a battery interface and power control unit 1320.

In use, a user of mobile station 1301 speaks into the microphone 1311 and his or her voice along with any detected background noise is converted into an analog voltage. The analog voltage is then converted into a digital signal through the Analog to Digital Converter (ADC) 1323. The control unit 1303 routes the digital signal into the DSP 1305 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 1325 for compensation of any frequency-dependent impairments that occur during transmission though the air such as phase and amplitude distortion. After equalizing the bit stream, the modulator 1327 combines the signal with a RF signal generated in the RF interface 1329. The modulator 1327 generates a sine wave by way of frequency or phase modulation. In order to prepare the signal for transmission, an up-converter 1331 combines the sine wave output from the modulator 1327 with another sine wave generated by a synthesizer 1333 to achieve the desired frequency of transmission. The signal is then sent through a PA 1319 to increase the signal to an appropriate power level. In practical systems, the PA 1319 acts as a variable gain amplifier whose gain is controlled by the DSP 1305 from information received from a network base station. The signal is then filtered within the duplexer 1321 and optionally sent to an antenna coupler 1335 to match impedances to provide maximum power transfer. Finally, the signal is transmitted via antenna 1317 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1301 are received via antenna 1317 and immediately amplified by a low noise amplifier (LNA) 1337. A down-converter 1339 lowers the carrier frequency while the demodulator 1341 strips away the RF leaving only a digital bit stream. The signal then goes through the equalizer 1325 and is processed by the DSP 1305. A Digital to Analog Converter (DAC) 1343 converts the signal and the resulting output is transmitted to the user through the speaker 1345, all under control of a Main Control Unit (MCU) 1303—which can be implemented as a Central Processing Unit (CPU) (not shown).

The MCU 1303 receives various signals including input signals from the keyboard 1347. The keyboard 1347 and/or the MCU 1303 in combination with other user input components (e.g., the microphone 1311) comprise a user interface circuitry for managing user input. The MCU 1303 runs a user interface software to facilitate user control of at least some functions of the mobile station 1301 to providing uniform content management for a user equipment. The MCU 1303 also delivers a display command and a switch command to the display 1307 and to the speech output switching controller, respectively. Further, the MCU 1303 exchanges information with the DSP 1305 and can access an optionally incorporated SIM card 1349 and a memory 1351. In addition, the MCU 1303 executes various control functions required of the station. The DSP 1305 may, depending upon the implementation, perform any of a variety of conventional digital processing functions on the voice signals. Additionally, DSP 1305 determines the background noise level of the local environment from the signals detected by microphone 1311 and sets the gain of microphone 1311 to a level selected to compensate for the natural tendency of the user of the mobile station 1301.

The CODEC 1313 includes the ADC 1323 and DAC 1343. The memory 1351 stores various data including call incoming tone data and is capable of storing other data including music data received via, e.g., the global Internet. The software module could reside in RAM memory, flash memory, registers, or any other form of writable storage medium known in the art. The memory device 1351 may be, but not limited to, a single memory, CD, DVD, ROM, RAM, EEPROM, optical storage, or any other non-volatile storage medium capable of storing digital data.

An optionally incorporated SIM card 1349 carries, for instance, important information, such as the cellular phone number, the carrier supplying service, subscription details, and security information. The SIM card 1349 serves primarily to identify the mobile station 1301 on a radio network. The card 1349 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    determining new content from a plurality of content of different categories;
    initiating presentation of the new content via a graphical user interface that includes, a dashboard providing a layout of the new content, a content manager that is invoked upon selection of a particular one of the new content for managing a group of content of a common category, and a content editor that is invoked upon selection of one of the content in the group for editing the selected content, and
    initiating a user-equipment-switching presentation of one or more user equipments connected to a platform and of the connection type.

2. A method of claim 1, wherein the categories include either contacts, messages, photographs, animations, videos, music, or a combination thereof.

3. A method of claim 1, further comprising:
    configuring default settings by category; and
    at least one of:
    automatically presenting or grouping the new content according to the default settings on at least one of a user equipment and a platform that is configured to communicate with the user equipment over a network, automatically synchronizing the new content according to the default settings between a user equipment and a platform that is configured to communicate with the user equipment over a network, automatically sharing the new content according to the default settings between two or more user equipments, or automatically publishing the new content according to the default settings on a website.

4. A method of claim 3, further comprising:
    presenting the default settings on at least one of the user equipment and the platform; and
    initiating opting out of the default setting as requested.

5. A method of claim 3, wherein the default setting includes smart grouping that organizes content chronically, per topic, per contact, per social group, or per chat.

6. A method of claim 3, wherein the default settings are configured based upon sizes of a content category and a content item, frequencies of user engagement with a content category and a content item, and the modification frequencies of a content category and a content item, ease of recovery of a content category and a content item, and values of a content category and a content item.

7. A method of claim 1, further comprising:
    connecting a plurality of user equipments of a user simultaneously to the platform, wherein the user-equipment-switching presentation allows a user to switch presentation of one or more of the user equipments that are connected to the platform.

8. An apparatus comprising:
    at least one processor; and
    at least one memory including computer program code, wherein the at least one memory and the computer program code configured to, with the at least one processor, cause the apparatus to perform at least the following:
        determine new content from a plurality of content of different categories;
        initiate presentation of the new content via a graphical user interface that includes, a dashboard providing a layout of the new content, a content manager that is invoked upon selection of a particular one of the new content for managing a group of content of a common category, and a content editor that is invoked upon selection of one of the content in the group for editing the selected content; and
        initiate a user-equipment-switching presentation of one or more user equipments connected to a platform and of the connection type.

9. An apparatus of claim 8, wherein the categories include either contacts, messages, photographs, animations, videos, music, or a combination thereof.

10. An apparatus of claim 8, wherein the apparatus is further caused to:
    configure default settings by category; and
    at least one of:
    automatically present or group the new content according to the default settings on at least one of a user equipment and a platform that is configured to communicate with the user equipment over a network, automatically synchronize the new content according to the default settings between a user equipment and a platform that is configured to communicate with the user equipment over a network, automatically share the new content according to the default settings between two or more user equipments, or automatically publish the new content according to the default settings on a website.

11. An apparatus of claim 10, wherein the apparatus is further caused to:
    present the default settings on at least one of the user equipment and the platform; and initiate opting out of the default setting as requested.

12. An apparatus of claim 10, wherein the default setting includes smart grouping that organizes content chronically, per topic, per contact, per social group, or per chat.

13. An apparatus of claim 10, wherein the default settings are configured based upon sizes of a content category and a content item, frequencies of user engagement with a content category and a content item, and the modification frequencies of a content category and a content item, ease of recovery of a content category and a content item, and values of a content category and a content item.

14. An apparatus of claim 8, wherein the apparatus is further caused to:
connect a plurality of user equipments of a user simultaneously to the platform, wherein the user-equipment-switching presentation allows a user to switch presentation of one or more of the user equipments that are connected to the platform.

15. A non-transitory computer-readable storage medium carrying one or more sequences of one or more instructions which, when executed by one or more processors, cause an apparatus to perform at least the following:
determining new content from a plurality of content of different categories;
initiating presentation of the new content via a graphical user interface that includes, a dashboard providing a layout of the new content, a content manager that is invoked upon selection of a particular one of the new content for managing a group of content of a common category, and a content editor that is invoked upon selection of one of the content in the group for editing the selected content; and
initiating a user-equipment-switching presentation of one or more user equipments connected to a platform and of the connection type.

16. A non-transitory computer-readable storage medium of claim 15, wherein the categories include either contacts, messages, photographs, animations, videos, music, or a combination thereof.

17. A non-transitory computer-readable storage medium of claim 15, wherein the apparatus is caused to further perform:
configuring default settings by category; and
at least one of:
automatically presenting or grouping the new content according to the default settings on at least one of a user equipment and a platform that is configured to communicate with the user equipment over a network, automatically synchronizing the new content according to the default settings between a user equipment and a platform that is configured to communicate with the user equipment over a network, automatically sharing the new content according to the default settings between two or more user equipments, or automatically publishing the new content according to the default settings on a website.

18. A non-transitory computer-readable storage medium of claim 17, wherein the apparatus is caused to further perform:
presenting the default settings on at least one of the user equipment and the platform; and
initiating opting out of the default setting as requested.

19. A non-transitory computer-readable storage medium of claim 17, wherein the default setting includes smart grouping that organizes content chronically, per topic, per contact, per social group, or per chat.

20. A non-transitory computer-readable storage medium of claim 17, wherein the default settings are configured based upon sizes of a content category and a content item, frequencies of user engagement with a content category and a content item, and the modification frequencies of a content category and a content item, ease of recovery of a content category and a content item, and values of a content category and a content item.

* * * * *